United States Patent Office 2,770,620
Patented Nov. 13, 1956

2,770,620

SENSITIZING DYESTUFFS

Adolf Sieglitz, Bad Soden am Taunus, Ludwig Berlin, Frankfurt am Main, and Heinrich Hamal, Ohren, near Limburg (Lahn), Germany, assignors to Farbwerke Hoechst Aktiengesellschaft vormals Meister Lucius & Bruning, Frankfurt am Main, Germany, a corporation of Germany No Drawing. Application January 18, 1955,
Serial No. 482,673

Claims priority, application Germany January 21, 1954

7 Claims. (Cl. 260—240.4)

The present invention relates to new sensitizing dyestuffs of the cyanine, styryl and merocyanine series; more particularly it relates to dyestuffs corresponding to the following general formulae

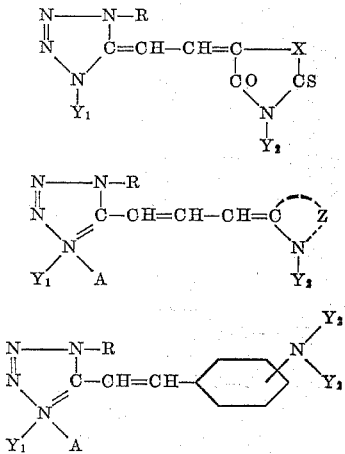

wherein R represents an alkyl or aryl group, A represents a negative radical of an inorganic acid, X stands for O, S, Se or N-alkyl, $Y_1$ and $Y_2$ stand for lower alkyls and Z represents the atoms necessary to complete a heterocyclic radical.

It is known to prepare sensitizing dyestuffs of the cyanine, styryl or merocyanine series from the quaternary salts of heterocyclic bases, the so called cyclammonium compounds. The dyestuffs are obtained according to known methods by condensing the said cyclammonium compounds with, for example, ortho-alkyl esters of aliphatic carboxylic acids or with dialkylaminobenzaldehydes or with methylene-omega-aldehydes of the heterocyclic series or their intermediate compounds which are formed at the synthesis of these aldehydes, or with heterocyclic bases containing an acetanilido-methylene group and corresponding to the general formula

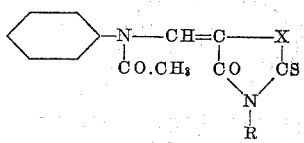

wherein X represents O, S, Se or N-alkyl and R stands for an alkyl group.

Now we have found that new sensitizing dyestuffs of the above dyestuff groups, which are especially suitable for the sensitization of silver halide emulsions, are obtained by using in the known processes as cyclammonium compounds quaternary salts derived from 1.2.3.4-tetrazoles and corresponding to the following general formua

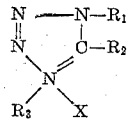

wherein $R_1$ represents an alkyl or aryl group, $R_2$ represents an alkyl group, $R_3$ stands for an alkyl group and X means a negative radical of an inorganic acid.

The manufacture of 1.5-dimethyl-1.2.3.4-tetrazole and 1-phenyl-5-methyl-1.2.3.4-tetrazole has already been described in literature (Chemisches Zentralblatt 1926, vol. II, page 2850 and Berichte der Deutschen Chemischen Gesellschaft, vol. 43, page 2908; see also Richter-Anschütz, Chemie der Kohlenstoffverbindungen, vol. III, page 170 et seq.). These heterocyclic bases can be transformed into their quaternary salts, for example, into the iodoethylate in the following manner:

1-phenyl-5-methyl-1.2.3.4-tetrazole-iodoethylate.

16 grams of 1-phenyl-5-methyl-1.2.3.4-tetrazole and 16 grams of ethyl iodide are heated for 15 hours in a sealing tube to 155° C.–160° C. The crystalline crude product is pulverized, triturated with ethyl acetate and boiled two or three times with ethyl acetate. After each boiling, the product is filtered with suction, while hot. Finally it is washed with a small quantity of acetone. A white crystalline powder is obtained which melts at 164° C. According to the analysis, 1 mol of ethyl iodide has been added. On account of the properties of the quaternary salt, the compound corresponds to the following probable formula

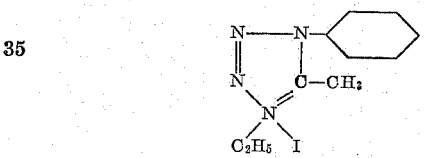

In an analogous manner, there is obtained from 1.5-dimethyl-1.2.3.4-tetrazole the 1.5-dimethyl-1.2.3.4-tetrazole-iodoethylate of the following probable formula:

After recrystallization from ethanol, the quaternary salt is obtained in the form of oblong colorless prisms which melt at 183° C.–184° C. with decomposition.

The following examples serve to illustrate the invention but they are not intended to limit it thereto:

Example 1

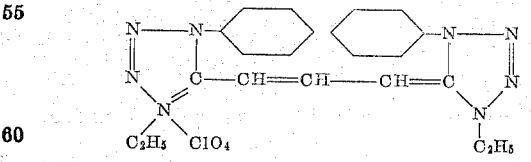

3.16 grams of 1-phenyl-5-methyl-1.2.3.4-tetrazole-iodoethylate are dissolved in a mixture of 15 cc. of dry pyridine, 3.3 cc. of ortho-formic acid triethyl ester, 1.4 cc. of triethylamine and 0.6 cc. of glacial acetic acid, the solution is heated at the boil and boiled for four hours under a reflux condenser. After precipitation with ether, the dyestuff is converted into the perchlorate and recrystallized from acetone. The pure dyestuff is obtained in the form of small rod-shaped yellow crystals which melt at 170° C. with decomposition. It produces a sensitization maximum at about 4520 Angstrom.

Example 2

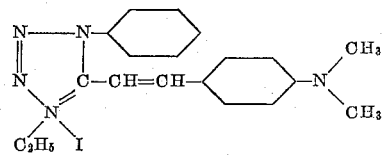

3.16 grams of 1-phenyl-5-methyl-1.2.3.4-tetrazole-iodoethylate and 1.5 grams of 4-dimethylamino-benzaldehyde are dissolved in 15 cc. of pyridine. To this solution 1.4 cc. of triethylamine and 0.6 cc. of glacial acetic acid are added and the mixture is boiled for 3 hours under a reflux condenser. The reaction product is precipitated with ether, the resulting resin is triturated with acetone and filtered off with suction. The crude dyestuff so obtained is recrystallized from acetone. Small rod-shaped yellow crystals are obtained which melt at 200° C.–201° C. with decomposition. The dyestuff produces a sensitization maximum at about 5000 Angstrom.

Example 3

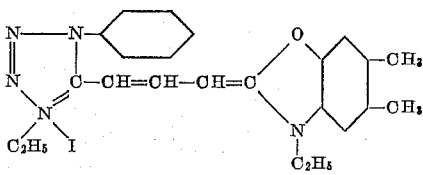

3.16 grams of 1-phenyl-5-methyl-1.2.3.4-tetrazole-iodoethylate and 4.62 grams of 2-(omega-acetanilino-vinyl)-5.6-dimethylbenzoxazole iodoethylate are heated at the boil in 40 cc. of absolute ethanol. A solution of 2.8 cc. of triethylamine in 10 cc. of absolute ethanol is then added and the mixture is boiled for 30 minutes under a reflux condenser. After cooling, the crystals which have separated are filtered off with suction and washed with ethanol. After recrystallization from ethanol, yellow crystals having the form of small obliquely cut off rods are obtained which melt at 237° C.–238° C. with decomposition. The dyestuff produces a sensitization maximum at about 4920 Angstrom.

Example 4

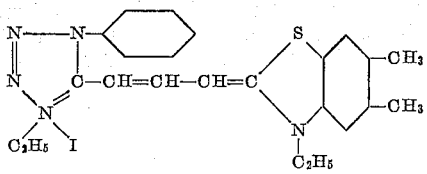

3.16 grams of 1-phenyl-5-methyl-1.2.3.4-tetrazole-iodoethylate are dissolved at 60° C. in 6 cc. of dry pyridine and a solution of 3.08 grams of 2-(omega-phenylimino-ethylidene)-3-ethyl-5.6-dimethyl-benzthiazoline in 10 cc. of pyridine is added. Into this mixture 1 cc. of acetic anhydride is slowly introduced drop by drop at 60° C. The temperature is kept for 30 minutes at 60° C.–65° C. The reaction product is cooled in the ice-bath, the dyestuff which has separated is filtered off with suction and washed with acetone. After recrystallization from ethanol orange-red crystals having the form of lamellae are obtained which melt at 237° C.–238° C. with decomposition. The dyestuff produces a sensitization maximum at about 5350 Angstrom.

Example 5

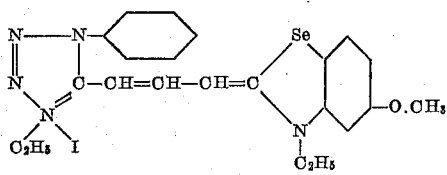

3.16 grams of 1-phenyl-5-methyl-1.2.3.4-tetrazole-iodoethylate are dissolved at 60° C. in 10 cc. of dry pyridine. A solution of 3.57 grams of 2-(omega-phenylimino-ethylidene)-3-ethyl-5-methoxy-benzseleneazoline in 10 cc. of pyridine is then added. Into this mixture 1 cc. of acetic anhydride is slowly introduced drop by drop at 60° C.–65° C. After an initial rise of temperature to 80° C., the dyestuff begins to separate in the form of crystals. Heating is continued for a further 30 minutes, the crude dyestuff which has been allowed to stand for a prolonged time is then filtered off with suction, washed with acetone and recrystallized from methanol. Lustrous yellow-red prisms are obtained which melt at 239° C. with decomposition. The dyestuff produces a sensitization maximum at about 5360 Angstrom.

Example 6

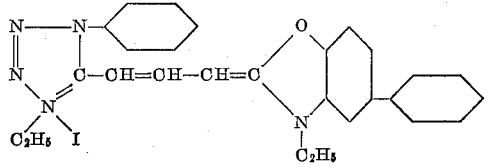

3.16 grams of 1-phenyl-5-methyl-1.2.3.4-tetrazole-iodoethylate are dissolved at 60° C. in 6 cc. of pyridine. A solution of 3.40 grams of 2-(omega-phenylimino-ethylidene)-3-ethyl-5-phenylbenzoxazoline in 8 cc. of pyridine is then added and into this mixture 1 cc. of acetic anhydride is slowly introduced drop by drop at 55° C.–60° C. The temperature is kept for 15 minutes at 55° C.–60° C. After cooling, a small amount of ether is added and the dyestuff precipitates. It is filtered off with suction, washed with acetone and recrystallized from ethanol. Orange-yellow crystals having the form of small lamellae are obtained, which melt at 222° C.–223° C. with decomposition. The dyestuff produces a sensitization maximum at about 4880 Angstrom.

Example 7

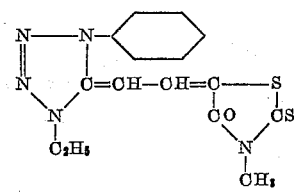

3.16 grams of 1-phenyl-5-methyl-1.2.3.4-tetrazole-iodoethylate and 2.92 grams of 5-(omega-acetanilino-methylene)-3-methylrhodanine are heated at the boil in 60 cc. of absolute ethanol. A solution of 2.8 cc. of triethylamine in 10 cc. of absolute ethanol is then added and the mixture is boiled for a further 15 minutes under a reflux condenser. After cooling, the crystals which have separated are filtered off with suction and washed with ethanol. After recrystallization from ethanol, orange-yellow small needles are obtained which melt at 165° C.–167° C. with decomposition. The dyestuff produces a sensitization maximum at about 5300 Angstrom.

Example 8

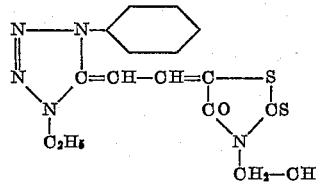

3.16 grams of 1-phenyl-5-methyl-1.2.3.4-tetrazole-iodoethylate and 3.18 grams of 5-(omega-acetanilino-methylene)-3-allylrhodanine are dissolved in 50 cc. of absolute ethanol, while hot. A solution of 2.8 cc. of triethylamine in 5 cc. of absolute ethanol is then added and the mixture is heated at the boil for 30 minutes. The dyestuff is recrystallized from ethanol and then obtained in the form of fine, felted small needles having a yellow-orange color and melting at 182° C.–183° C. with decomposition. It produces a sensitization maximum at about 5300 Angstrom.

*Example 9*

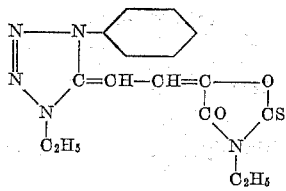

3.16 grams of 1-phenyl-5-methyl-1.2.3.4-tetrazole-iodoethylate and 2.90 grams of 5-(omega-acetanilino-methylene)-3-ethyloxazolidone are dissolvved in 50 cc. of boiling ethanol. A solution of 2.8 cc. of triethylamine in 6 cc. of ethanol is then added and the mixture is heated at the boil for 2 hours. After allowing the mixture to stand for a prolonged time, the crude dyestuff separates in the form of felted yellow needles. After recrystallization from ethanol, light yellow felted small needles are obtained which melt at 148° C.–150° C. with decomposition. The dyestuff produces a sensitization maximum at about 4930 Angstrom.

*Example 10*

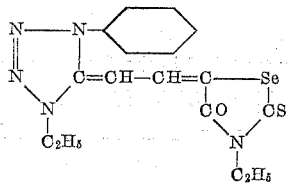

3.16 grams of 1-phenyl-5-methyl-1.2.3.4-tetrazole-iodoethylate and 3.53 grams of 5-(omega-acetanilino-methylene)-3-ethylselenorhodanine are heated at the boil in 80 cc. of ethanol. 2.8 cc. of triethylamine are then added dropwise and the mixture is boiled for a further 40 minutes under a reflux condenser. After cooling, the crude dyestuff is filtered off with suction and washed with ethanol. After recrystallization from ethanol, orange-colored felted small needles are obtained, which melt at 226° C.–227° C. with decomposition. The dyestuff produces a sensitization maximum at about 5430 Angstrom.

*Example 11*

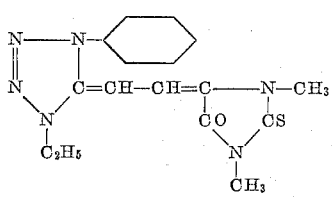

3.16 grams of 1-phenyl-5-methyl-1.2.3.4-tetrazole-iodoethylate and 2.89 grams of 5-(omega-acetanilino-methylene)-1.3-dimethylthiohydantoin are heated at the boil in 40 cc. of absolute ethanol. 2.8 cc. of triethylamine are then added dropwise and the mixture is boiled for another hour under a reflux condenser. After allowing the mixture to stand for a prolonged time, the crystalline crude dyestuff separates. After recrystallization from ethanol, fine felted small needles having an orange-yellow color are obtained which melt at 195° C.–196° C. with decomposition. The dyestuff produces a sensitization maximum at about 5020 Angstrom.

*Example 12*

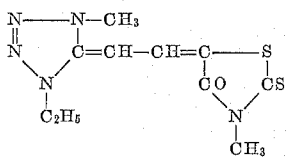

3.29 grams of 1.5-dimethyl-1.2.3.4-tetrazole-iodoethylate and 2.92 grams of 5-(omega-acetanilino-methylene)-3-methylrhodanine are heated at the boil in 70 cc. of absolute ethanol. 2.8 cc. of triethylamine are then added dropwise and the mixture is boiled for 3 hours under a reflux condenser. After cooling, the crude dyestuff is filtered off with suction, washed with ethanol and recrystallized from ethanol. Yellow-orange felted small needles are obtained which melt at 257° C.–258° C. with decomposition. The dyestuff produces a sensitization maximum at about 5200 Angstrom.

*Example 13*

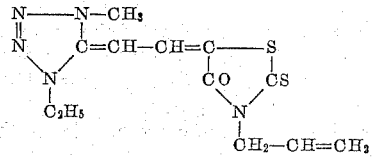

3.29 grams of 1.5-dimethyl-1.2.3.4-tetrazole-iodoethylate and 3.18 grams of 5-(omega-acetanilino-methylene)-3-allylrhodanine are dissolved in 70 cc. of absolute ethanol, the solution is heated at the boil and 2 cc. of triethylamine are added dropwise. The mixture is boiled for 3 hours under a reflux condenser. The resulting crystalline magma is filtered off with suction, while hot, and washed with ethanol. After recrystallization from ethanol, yellow-orange felted small needles are obtained which melt at 242° C.–243° C. with decomposition. The dyestuff produces a sensitization maximum at about 5220 Angstrom.

*Example 14*

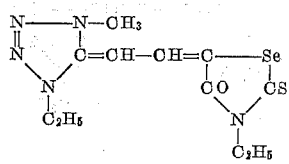

3.29 grams of 1.5-dimethyl-1.2.3.4-tetrazole-iodoethylate and 3.53 grams of 5-(omega-acetanilino-methylene)-3-ethylselenorhodanine are heated at the boil in 60 cc. of absolute ethanol. 2 cc. of triethylamine are then added dropwise and the mixture is boiled for a further 90 minutes under a reflux condenser. The crystals which have separated are filtered off with suction at 65° C.–70° C. and washed with ethanol. After recrystallization from ethanol, the dyestuff is obtained in the form of orange-colored felted small needles which melt at 272° C.–273° C. with decomposition. It produces a sensitization maximum at about 5300 Angstrom.

We claim:

1. Sensitizing dyestuffs having a formula selected from the group consisting of the following three formulae:

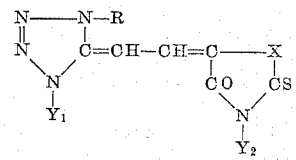

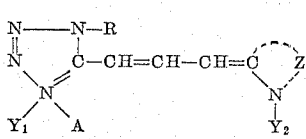

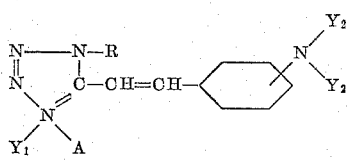

wherein R represents a member of the group consisting of lower alkyl and phenyl, A represents a negative radical of an inorganic acid, X stands for a member selected from the group consisting of O, S, Se and N-alkyl, $Y_1$ and $Y_2$ stand for lower alkyls and Z represents the atoms necessary to complete a heterocyclic radical.

2. Sensitizing dyestuffs corresponding to the following general formula

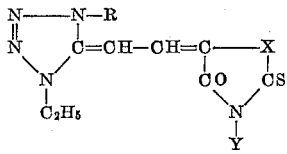

wherein R represents a member of the group consisting of lower alkyl and phenyl, X stands for a member selected from the group consisting of O, S, Se and N-alkyl, and Y represents a lower alkyl group.

3. The sensitizing dyestuff corresponding to the following formula

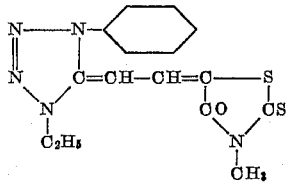

4. The sensitizing dyestuff corresponding to the following formula

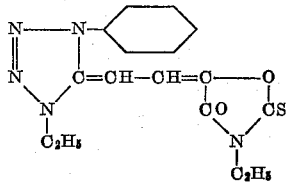

5. The sensitizing dyestuff corresponding to the following formula

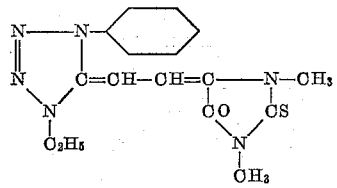

6. The sensitizing dyestuff corresponding to the following formula

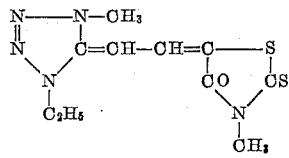

7. The sensitizing dyestuff corresponding to the following formula

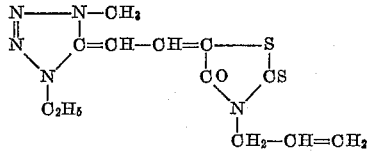

References Cited in the file of this patent
UNITED STATES PATENTS
2,689,849        Brooker _____ Sept. 21, 1954